United States Patent
Xi et al.

(10) Patent No.: US 10,688,568 B2
(45) Date of Patent: Jun. 23, 2020

(54) KEY CUTTING MACHINE AND A FIXTURE FOR KEY CUTTING MACHINE

(71) Applicant: Shenzhen Xhorse Electronics Co., Ltd, Shenzhen (CN)

(72) Inventors: Yongfeng Xi, Shenzhen (CN); Shiting Han, Shenzhen (CN); Yijie Hao, Weifang (CN); Yuan He, Shenzhen (CN); Guozhong Cao, Shenzhen (CN); Chenglong Li, Shenzhen (CN); Junfeng Chen, Yuzhou (CN)

(73) Assignee: Shenzhen Xhorse Electronics Co., Ltd, Guangdong (CN)

( * ) Notice: Subject to any disclaimer, the term of this patent is extended or adjusted under 35 U.S.C. 154(b) by 135 days.

(21) Appl. No.: 15/921,638

(22) Filed: Mar. 14, 2018

(65) Prior Publication Data
US 2019/0015908 A1 Jan. 17, 2019

(30) Foreign Application Priority Data
Jul. 12, 2017 (CN) .......................... 2017 1 0566435

(51) Int. Cl.
B23Q 3/02 (2006.01)
B23C 3/35 (2006.01)
B25B 1/10 (2006.01)
B25B 1/24 (2006.01)

(52) U.S. Cl.
CPC ............... *B23C 3/35* (2013.01); *B23C 3/355* (2013.01); *B25B 1/103* (2013.01); *B25B 1/24* (2013.01)

(58) Field of Classification Search
CPC ....................................................... B25B 3/00; B25B 1/24; B25B 1/2478; B25B 5/00; B25B 5/02
See application file for complete search history.

(56) References Cited

U.S. PATENT DOCUMENTS

| | | | | |
|---|---|---|---|---|
| 4,084,369 A | * | 4/1978 | Luebbers | B21L 9/065 269/249 |
| 7,047,610 B2 | * | 5/2006 | Dawson | F16H 7/24 269/249 |
| 10,179,392 B2 | * | 1/2019 | Taylor | B25B 1/2478 |
| 2008/0255623 A1 | * | 10/2008 | Steiner | A61F 2/4644 606/86 R |
| 2009/0283951 A1 | * | 11/2009 | Rowley | B25B 5/068 269/252 |
| 2019/0015908 A1 | * | 1/2019 | Xi | B23C 3/35 |

* cited by examiner

Primary Examiner — Lee D Wilson
(74) Attorney, Agent, or Firm — Andrew Malarz, Esq.

(57) ABSTRACT

The invention discloses a fixture for a key cutting machine, comprising a base, a clamping mechanism and a rotating assembly, wherein the clamping mechanism comprises a first clamping block, a second clamping block, a central shaft and an adjusting piece, wherein one end of the central shaft is connected to the base and sequentially passes through the first clamping block and the second clamping block, wherein the adjusting piece is disposed at the other end of the central shaft for adjusting the distance between the first clamping block and the second clamping block in order to hold the key, wherein the rotating assembly is disposed between the first clamping block and the base, the first clamping block is rotationally connected to the base. Providing that the volume and the size of the key cutting machine fixture do not change, one can freely switch between different clamping surfaces using only a small directional force, which makes for flexible operation, no dead spots and strong applicability.

8 Claims, 4 Drawing Sheets

KEY CUTTING MACHINE AND A FIXTURE FOR KEY CUTTING MACHINE

CROSS-REFERENCE TO RELATED APPLICATIONS

The present patent application claims a priority of the Chinese patent application no. 201710566435.6, filed on Jul. 12, 2017, which content should be considered a part of the instant patent application through incorporation by reference.

BACKGROUND OF THE INVENTION

Field of the Invention

The present application relates to the technical field of clamps, and more particularly to key cutting machines and clamps for key cutting machines.

Description of Related Art

Fixture is a mechanical device that connects a machine tool and a workpiece. Its function is to position and fasten the workpiece so that the workpiece has the correct position and good connection rigidity with respect to the machine tool, so as to finish the machining of the workpiece with high quality and achieve the required dimensional accuracy, shape accuracy, surface quality and so on.

The key cutting machine is a machine that uses the original key code to duplicate the key, it can cut the key blanks in a very quick manner, providing effective and precise keys. Accordingly, the key cutting machine fixture is a kind of fixture used in key cutting engineering in order to fasten blank key or target key.

Commonly used key cutting machine fixtures mounted on a horizontal milling machine has four clamping positions. Depending on the type and size of different keys one can switch to a different clamping position. Such as the key cutting machine fixture disclosed in the patent ZL201521133575.7: two ball pins are arranged in parallel on the base of the fixture so as to match four dowel notches of the end face of the first clamping block of the fixture for switching between different clamping surfaces. However, during the operation of the fixture jams are common and the switching itself is not swift enough to enable free switching between different clamping surfaces. What's more, most of the other similar fixtures have only one square-shaped slot, so one needs to lift the whole upper part of the clamping element, switch the clamping surface and then put it in the slot anew, which makes it impossible to switch freely between surfaces and is complicated to operate.

BRIEF SUMMARY OF THE INVENTION

The present invention provides a fixture for a key processing machine which aims to solve the technical problem that the fixture of the key cutting machine is not flexible enough to switch freely between different clamping surfaces and is prone to failure.

The present invention provides a fixture for a key processing machine that comprises a base, a clamping mechanism and a rotating assembly;

The clamping mechanism comprises a first clamping block, a second clamping block, a central shaft and an adjusting piece;

One end of the central shaft is connected to the base and sequentially passes through the first clamping block and the second clamping block, the adjusting piece is disposed at the other end of the central shaft and is used for adjusting the distance between the first clamping block and the second clamping block in order to hold the key;

The rotating assembly is arranged between the first clamping block and the base. The first clamping block is rotationally connected with the base by the rotating assembly.

Further, the rotating assembly includes a rotating wedge and a first ratchet arranged on the base, the rotating wedge disposed on the base possesses a second ratchet matched with the first ratchet. The said rotating wedge is rotationally connected with the base through the first ratchet and the second ratchet.

Further, a working space for holding a key is formed between the first clamping block and the second clamping block and the number of the ratchet teeth is the same as the number of such working spaces, the second ratchet being set to be matched with the first ratchet and each ratchet corresponding to one working space.

Further, the second clamping block is sleeved on the first clamping block so that the second clamping block can only move in the axial direction relatively to the first. The first clamping block is sleeved on the rotating wedge so that the first clamping block and the rotating wedge are fixed in relation to each other. The working space is formed between the top end of the second clamping block moving towards the first clamping block and the corresponding position of the first clamping block.

Further, the first clamping block has a hollow boss, the second clamping block is sleeved on the said hollow boss. Inside the said hollow boss a convex edge is arranged along the inner periphery. Two sides of the convex edge are respectively provided with a first elastic piece and a second elastic piece. One end of the first elastic piece abuts against the said rotating wedge and the other end abuts against the said convex edge. One end of the second elastic piece abuts against the second clamping block and the other end presses against the convex edge.

Further, the invention comprises also a thrust bearing provided in the adjusting piece and sleeved around the outer circumference of the center shaft. The said thrust bearing abuts against the second clamping block.

Further, both the base and the rotating wedge are provided with a circular boss protruding outwardly, the first ratchet is arranged on the end plane of the circular boss of the base, the second ratchet is provided on the end plane of the circular boss of the rotating wedge.

Further, the invention comprises a fool-proof mechanism for pairing the first clamping block and the second clamping block, the said fool-proof mechanism includes a convex block mounted on the top end of the second clamping block moving towards the first clamping block and a notch provided on the first clamping block adapted to the convex block.

The present invention provides also a key cutting machine including the above-mentioned fixture for a key cutting machine.

The key cutting machine fixture provided by the invention adopts a rotating mechanism to realize the positioning and the switching of the different working spaces of the key cutting machine fixture. Provided that the size and the volume of the key processing machine fixture do not change, only a small directional force may be required to freely switch between different clamping surfaces. The invention has the advantages of flexible operation, no dead spots and strong applicability. Compared with the common key fixtures, an adjusting elastic piece is added as the resilient elastic element in the key switching process to further improve the flexibility of switching between clamping surfaces and effectively overcome the defects and deficiencies of traditional key cutting machine fixtures such as jamming and inflexible switching of surfaces. Besides, this solution can be well applied to key cutting machines.

Figure 1:
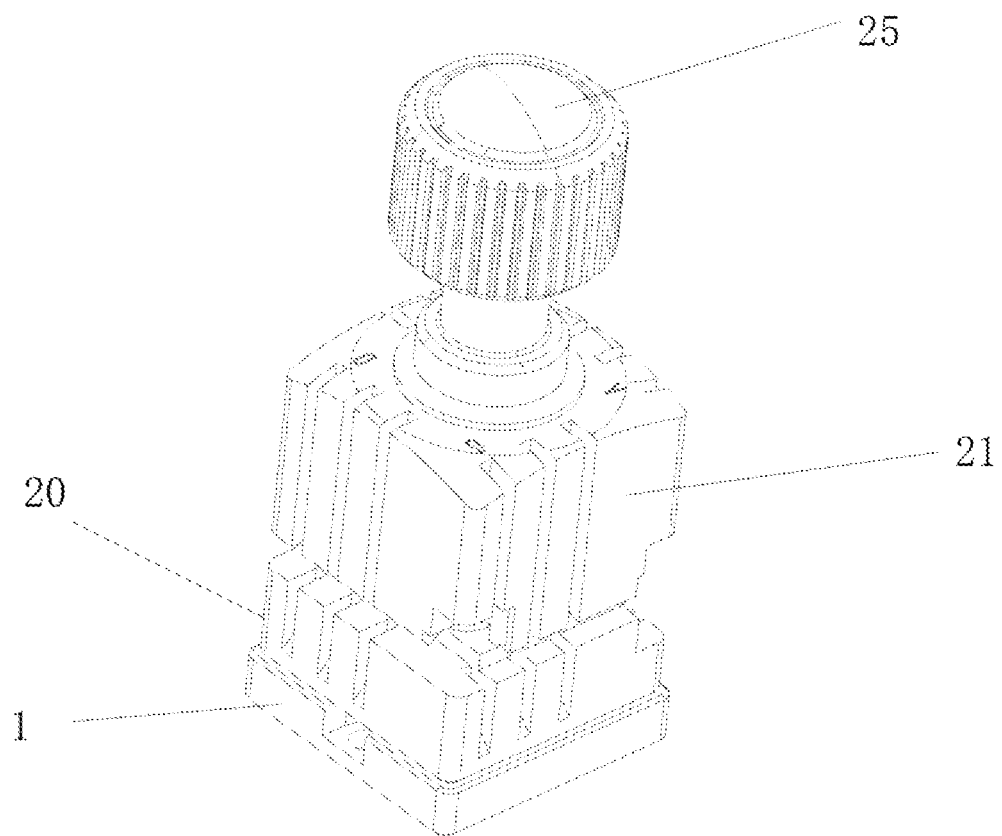
FIG. 1 is a perspective view of an embodiment of the present invention—a fixture for a key cutting machine.
Figure 2:
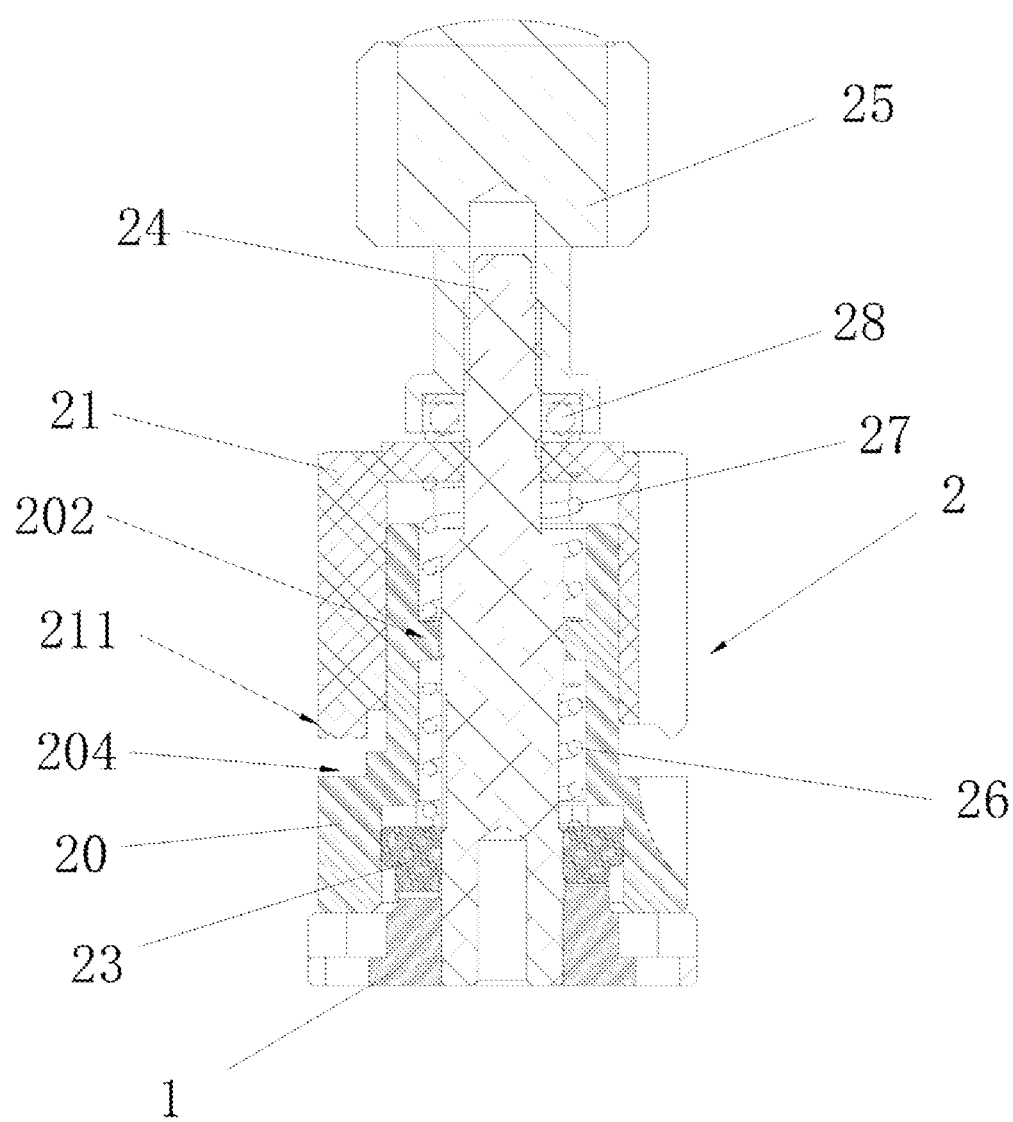
FIG. 2 is a cross-sectional view of an embodiment of the present invention—a fixture for a key cutting machine.
Figure 3:
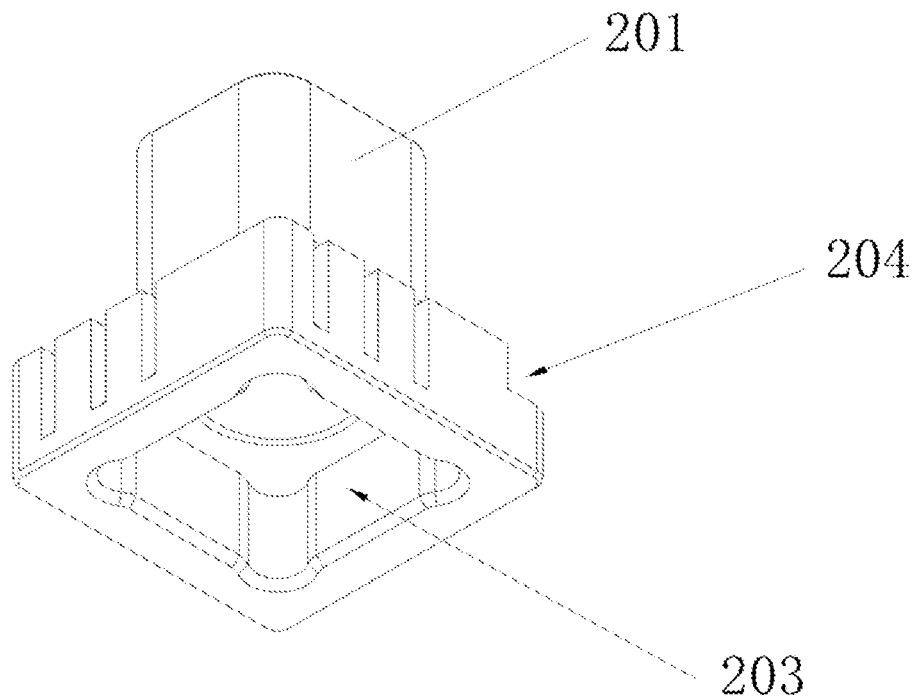
FIG. 3 is a schematic structural view of an embodiment of the first clamping block of the present invention.
Figure 4:
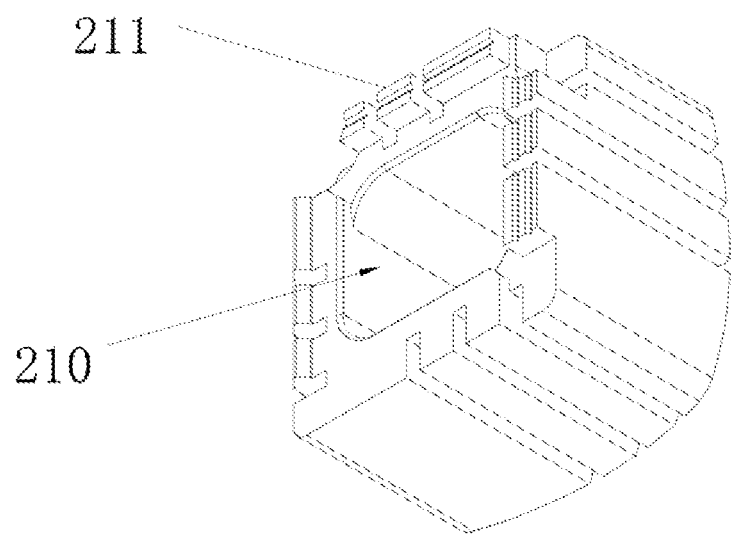
FIG. 4 is a schematic structural view of an embodiment of the second clamping block of the present invention.

The embodiment, the function and the advantages of the object of the present invention will be further described with reference to the accompanying drawings.

DETAILED DESCRIPTION OF THE INVENTION

The technical solutions used in the embodiment of the present invention are clearly and completely described below with reference to the accompanying drawings. Obviously, the described embodiments are only a part of and not all of the embodiments of the present invention. All other embodiments obtained without creative efforts by technical personnel of ordinary skill in this technical field based on the embodiments of the present invention shall fall within the protection scope of the present invention.

It should be noted that, all directional indicators such as upper, lower, left, right, front, rear, and the like in the embodiments of the present invention are used for the sole purpose of explaining the relative spatial relations between the components and their movement in a specific position (as shown in the drawings), if the position changes, the said directional indicators will change accordingly.

In addition, the descriptions such as "first", "second" and the like are used exclusively for the purpose of description and cannot be understood as indicating or suggesting relative importance or implying the number of the indicated technical features.

Thus, features defined as "first" and "second" may explicitly or implicitly include at least one of the features. In addition, the technical solutions present in the various embodiments may be combined with each other, but they must be implementable by technical personnel skilled in this or the general technical field. When the combinations of the technical solutions appear contradictory or cannot be implemented, it should be considered that the combination of the technical solutions does not exist, nor is it within the protection scope of the present invention.

It should be understood that the specific embodiments described herein are merely used to explain the present invention and are not intended to limit the present invention.

With reference to FIG. 1-6, a fixture for a key cutting machine according to the present invention includes a base 1, a clamping mechanism 2 and a rotating assembly, wherein the base 1 holds and protects other parts of the said fixture for a key cutting machine. The clamping mechanism 2 comprises a first clamping block 20, a second clamping block 21, a central shaft 24 and an adjusting piece 25.

One end of the central shaft 24 is fixedly connected to the base 1, the other end passes through the first clamping block 20 and the second clamping block 21 in sequence, from which it arrives at the adjusting piece 25 and connects with the adjusting piece 25. The key subject to cutting is placed between first clamping block 20 and the second clamping block 21. The distance between the first clamping block 20 and the second clamping block 21 can be adjusted by the adjusting piece 25 in order to clamp the key. The rotating assembly is disposed between the base 1 and the first clamping block 20, so that the first clamping block 20 can form a rotating connection with the base 1 through the rotating assembly.

The adjustment of the clamping can be realized by means of a threaded connection between the central shaft 24 and the adjusting piece 25. The central shaft 24 is provided with a screw thread and the adjusting piece 25 is provided with a screw thread adapted to the screw thread of central shaft 24. The central shaft 24 is connected with the adjusting piece 25 through an internal screw thread. The adjusting piece 25 can press or relax the second clamping block 21 by way of adjusting the length of the connection with the central shaft and thus control the clamping of the key.

For convenience of operation, an elastic piece may also be disposed between the first clamping block 20 and the second clamping block 21 to create an interaction force between them. When the adjusting piece 25 relaxes the force exerted on the second clamping block 21, the second clamping block 21 is automatically separated from the first clamping block 20 due to the elastic force.

Figure 5:
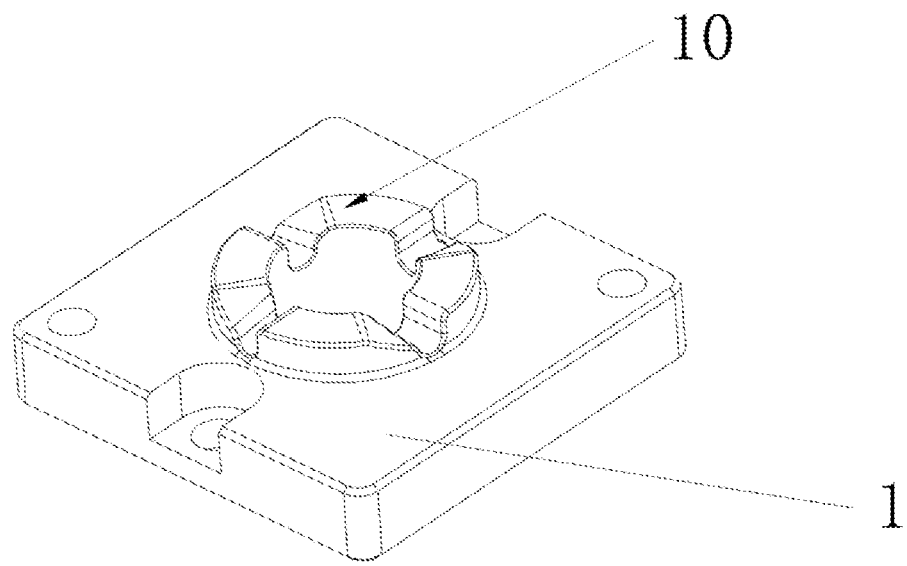
FIG. 5 is a schematic structural view of an embodiment of the base according to the present invention.
Figure 6:
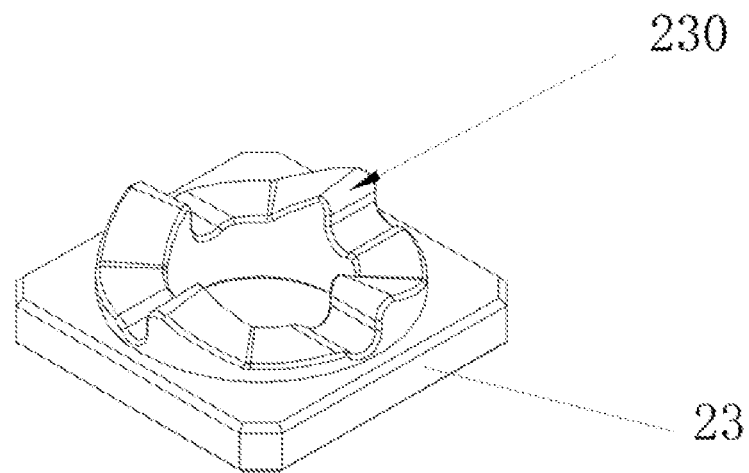
FIG. 6 is a schematic structural view of an embodiment of the rotating wedge according to the present invention.

In this embodiment, thanks to the rotation assembly, the rotation between the first clamping block 20 and the base 1 is created, that is to say, there is a transmission of motion between the first clamping block 20 and the base 1 through the ratchet. Referring to FIG. 5-6, the rotating assembly includes a rotating wedge 23 and the first ratchet 10 disposed on the base 1. The rotating wedge 23 is also equipped with the second ratchet 230 adapted to the first ratchet 10. The rotating wedge 23 is arranged on the base 1 through the second ratchet 230 and the first ratchet 10. When the first clamping block 20 is rotated, the rotating wedge 23 is driven to rotate in a specific direction. Obviously, the rotating assembly is not limited to being provided as a ratchet mechanism, the rotation of the first clamping block 20 relative to the base 1 can be achieved by means of another gear train mechanism.

Compared with the key cutting machine fixtures known to technicians skilled in this particular technical field, the present invention uses the rotating assembly 23 as the rotating medium. Provided that the original size and volume of the fixture do not change, it can achieve more flexible, smoother and easier turning of the clamping mechanism 2 in relation to the base 1, so as to complete the switching between the different clamping surfaces. What's more, it has a simple structure, takes little space and its production cost is low. It can better suit keys of various types and sizes found in key cutting engineering and improve the efficiency of key cutting.

Obviously, the key clamping position between the first clamping block 20 and the second clamping block 21 constitutes a working space, one working space corresponds to one clamping surface.

Referring to FIG. 5-6, in the present embodiment the first ratchet 10 is provided as a four-tooth ratchet, while the second ratchet 230 is provided as a four-tooth ratchet that matches the first ratchet 10, this means that the rotating wedge 23 can be set at four different angles. In contrast, the first clamping block 20 and the second clamping block 21 are both arranged as rectangular prisms, whose side faces match one another to form four clamping spaces, i.e. there are four working spaces. Each working space corresponds to a different angle, when the rotating wedge 23 turns by one tooth the working space turns accordingly by one.

In another embodiment, the first ratchet 10 can be a six-teeth ratchet, while the second ratchet 230 can be arranged as a six-teeth ratchet that matches the first ratchet 10. In this way the rotary wedge 23 can be turned to six different angles, which gives six clamping surfaces, each of which separately corresponds to each angle.

Of course, the present invention does not limit the number of teeth of the ratchet. According to actual needs, the first ratchet 10 and the second ratchet 230 may be correspondingly arranged as multi-tooth ratchets. A plurality of working spaces can be set up, in accordance with the number of ratchet teeth, with each ratchet tooth corresponding to a separate working space.

Further, to ensure the right function of the fixture for key cutting machine, that is, to hold the key between the first clamping block 20 and the second clamping block 21 and to be able to change the working space in a flexible manner, the aforementioned fixture for key cutting machine is arranged as follows:

The second clamping block 21 is sleeved on the first clamping block 20 in a movable manner. The second clamping block 21 can move along the axial direction relatively to the first clamping block 20; the second clamping block 21 and the first clamping block 20 are fixed in relation to each other in a tangential direction, that is to say there can be no relative rotation between the two blocks. The working space is formed between the top end of the second clamping block 21 moving towards the first clamping block 20 and the matching part of the first clamping block 20.

The first clamping block 20 is sleeved on the rotating wedge 23. The first clamping block 20 and the second clamping block 21 can drive the rotating wedge 23 to rotate simultaneously. Another option is that the first clamping block 20 drives both the second clamping block 21 and the rotating wedge 23 to simultaneous rotation. The rotating wedge 23 through the ratchets can control the movement of the first clamping block 20 and the second clamping block 21 to rotate in a fixed direction. Through the cooperation of the rotating wedge 23 and the base 1 the transition to different working spaces can be made.

In addition, in order to enable the first clamping block 20 and the second clamping block 21 to drive the rotating wedge 23 to rotation, as shown in FIG. 6, the rotating wedge 23 has a prism shape and is equipped with the second ratchet 230 that is directed towards the basal surface of the base 1 and matches the first ratchet 10. The first clamping block 20 possesses a prism-shaped hollow boss 201 extending in the direction opposite to the direction of movement of the second clamping block 21. On the opposite side of the hollow boss 201 there is the first groove 203 concaved inwardly. The first groove matches the external shape of the rotary wedge 23. The rotary wedge 23 can be embedded in the first groove 203. Since the rotary wedge 23 is prism-shaped, by turning the first clamping block 20 one can drive the rotary wedge 23 to turn accordingly.

In addition, the second clamping block 21 has the second groove 210 matched with the hollow boss 201. The hollow boss 201 is inserted into the second groove 210 and can slide back and forth along the inside surface of the second groove 210. The gap between the side surface of the second groove 210 and the matching part of the first clamping block 20 is the working space. When a key is placed in the working space, the second clamping block 21 moves toward the first clamping block 20, which causes the side surface of the second groove 210 to press against and hold the key.

Obviously, in another embodiment, in order to enable the first clamping block 20 and the second clamping block 21 to drive the rotating wedge 23 to turn, the rotating wedge 23 and the hollow boss 201 may also be shaped into a cylinder, on which a guiding slot needs to be arranged. Further, a guiding pin matching the guiding slot is arranged on the inner surface of the first groove 203 and the second groove 210, the guiding pin fits into the guiding groove, at the same time the guiding slot and the guiding pin fix the position of the rotating wedge 23 and the first clamping block 20 so that both can rotate only relatively to the base at the same time and cannot rotate relatively to each other. In addition, since the guiding slot of the hollow boss 201 matches the guiding pin of the second groove 210, the second clamping block 21 can move in the axial direction relatively to the first clamping block 20 and the second clamping block 21, the first clamping block 20 and the rotary wedge 23 can make a rotary movement being fixed in relation to each other at the same time.

In this embodiment, the elastic piece between the first clamping block 20 and the second clamping block 21 is divided into two, that is, the first elastic piece 26 and the second elastic piece 27. Moreover, both of the elastic pieces are disposed in the inside part of the hollow boss 201 and sleeved on the central shaft 24. The hollow boss 201 along its inner periphery has a convex edge 202, the first elastic piece 26 and the second elastic piece are separately disposed at the two sides of the convex edge 202.

In the axial direction, one of the first elastic piece 26 presses against the rotating wedge 23 and the other abuts against the convex edge 202 in this way providing a restoring force to the surface of the ratchet, allowing the second ratchet wheel 230 to automatically fix itself in the base 1 when rotated to any of the fixed positions, one end of the second elastic piece 27 abuts against the second clamping block 21 and the other presses against the convex edge 202 providing a restoring force to the second clamping block 21, which enables the second clamping block 21 to press against the adjusting piece 25 to make the two elements relatively static. Further, the second clamping block 21 due to the rotation of the adjusting piece moves relatively to the first clamping block 20, which enables the clamping and relaxing of the key. On the other hand, the second elastic piece may prevent the second clamping block 21 from moving the first clamping block 20 at the moment of releasing the key from the first clamping block 20.

The above-mentioned two elastic pieces of the key cutting machine fixture further improve the flexibility of switching between different clamping surfaces and help effectively overcome the defects and deficiencies of switching between different clamping surfaces in traditional key cutting machines fixtures such as jamming and inflexible switching.

Specifically, the elastic piece in the present embodiment is provided as a spring.

In addition, the adjusting piece 25 is also equipped with a thrust bearing 28, the thrust bearing 28 is sleeved on the outer periphery of the central shaft 24 and pressed against the second clamping block 21, so as to prevent the adjusting piece 25 from directly touching the end surface of the second clamping block 21, avoiding the abrasion caused by frequent rotation, at the same time reducing the resistance of the adjusting piece 25, which improves the efficiency of adjusting.

In order to make the relative rotation between the base 1 and the rotating wedge 23 more effective, the base 1 and the rotating wedge 23 are provided with outwardly protruding circular bosses, the first ratchet 10 is disposed on the end surface of the circular boss of the base 1, the second ratchet 230 is disposed on the end surface of the circular boss of the rotating wedge 23.

The above-mentioned key cutting machine fixture is further provided with a fool-proof mechanism for pairing the first clamping block 20 and the second clamping block 21 so as to avoid errors in the assembly process. In this embodiment the foolproof mechanism includes a convex block 211 protruding outwardly from the side edge of the second groove 210 of the second clamping block 21 and a notch 204 that is arranged on the first clamping block 20 and matches the convex block 211. If the mechanism is correctly installed, the convex block 211 can be embedded in the notch 204. If it is installed incorrectly, the convex block 211 abuts against the first clamping block 20 and the key cannot be clamped.

In addition, the fool-proof mechanism is not limited to the above arrangement, it can be also implemented through different configurations of the first clamping block 20 and the second clamping block 21, so that the first clamping block 20 and the second clamping block 21 match one another.

The present invention further provides a key cutting machine that includes the above-mentioned fixture for a key cutting machine, and in particular, a machine that possess two of the above-mentioned fixtures for a key cutting machine for holding the key blank and the copy key respectively.

The above is only a preferred embodiment of the present invention and does not intend to limit the scope of the present invention. Any use of equivalent structure or equivalent process alteration made according to the content of these instructions and drawings or any direct or indirect application thereof in other related technical field are equally included in the protection scope of the present invention.

LIST OF REFERENCE NUMERALS

1—base,
2—clamping mechanism,
10—first ratchet,
20—first clamping block,
21—second clamping block,
23—rotating wedge,
24—central shaft,
25—adjusting piece,
26—first elastic piece,
27—second elastic piece,
28—thrust bearing,
201—hollow boss,
202—convex edge,
203—first groove,
204—notch,
210—second groove,
211—convex block,
230—second ratchet.

The invention claimed is:

1. A fixture for a key cutting machine, comprising a base, a clamping mechanism and a rotating assembly, wherein
  the clamping mechanism comprises a first clamping block, a second clamping block, a central shaft and an adjusting piece, wherein one end of the central shaft is connected to the base and sequentially passes through the first clamping block and the second clamping block, wherein the adjusting piece is disposed at the other end of the central shaft for adjusting the distance between the first clamping block and the second clamping block in order to hold the key,
  wherein the rotating assembly is disposed between the first clamping block and the base, the first clamping block is rotationally connected to the base,
  wherein the rotating assembly comprises a rotating wedge and a first ratchet which is arranged on the base, wherein the rotating wedge disposed on the base possesses a second ratchet matched with the first ratchet, and wherein the rotating wedge is rotationally connected with the base through the first ratchet and the second ratchet.

2. The fixture for a key cutting machine according to claim 1, wherein a working space for holding a key is formed between the first clamping block and the second clamping block, wherein the number of the ratchet teeth is the same as the number of such working spaces, wherein the second ratchet being set up to be matched with the first ratchet and each ratchet corresponding to one working space.

3. A fixture for a key cutting machine, comprising a base, a clamping mechanism and a rotating assembly, wherein
  the clamping mechanism comprises a first clamping block, a second clamping block, a central shaft and an adjusting piece, wherein one end of the central shaft is connected to the base and sequentially passes through the first clamping block and the second clamping block, wherein the adjusting piece is disposed at the other end of the central shaft for adjusting the distance between the first clamping block and the second clamping block in order to hold the key,
  wherein the rotating assembly is disposed between the first clamping block and the base, the first clamping block is rotationally connected to the base,
  wherein the rotating assembly comprises a rotating wedge and a first ratchet which is arranged on the base, wherein the rotating wedge disposed on the base possesses a second ratchet matched with the first ratchet, and wherein the rotating wedge is rotationally connected with the base through the first ratchet and the second ratchet,
  wherein a working space for holding a key is formed between the first clamping block and the second clamping block, wherein the number of the ratchet teeth is the same as the number of such working spaces, wherein the second ratchet being set up to be matched with the first ratchet and each ratchet corresponding to one working space,
  wherein the second clamping block is sleeved on the first clamping block so that the second clamping block can only make an axial movement relative to the first clamping block, wherein the first clamping block is sleeved on the rotating wedge so that the first clamping block and the rotating wedge are fixed in relation to each other, wherein the working space is formed between the head of the second clamping block moving towards the first clamping block and the corresponding position of the first clamping block.

4. The fixture for a key cutting machine according to claim 3, wherein the first clamping block has a hollow boss, and the second clamping block is sleeved on the said hollow boss, wherein inside the said hollow boss a convex edge is arranged along the inner periphery, wherein two sides of the convex edge are respectively provided with a first elastic piece and a second elastic piece, wherein one end of the first elastic piece abuts against the above-mentioned rotating wedge and the other end abuts against the said convex edge, wherein one end of the second elastic piece abuts against the second clamping block and the other end presses against the convex edge.

5. The fixture for a key cutting machine according to claim 3, wherein the fixture comprises a thrust bearing provided in the adjusting piece and sleeved around the outer circumference of the center shaft, wherein the thrust bearing presses against the second clamping block.

6. The fixture for a key cutting machine according to claim 3, wherein both the base and the rotating wedge are provided with a circular boss protruding outwardly, wherein the first ratchet is arranged on the end plane of the circular boss of the base, wherein the second ratchet being provided on the end plane of the circular boss of the rotating wedge.

7. The fixture for a key cutting machine according to claim 3, wherein the fixture comprises a fool-proof mechanism for pairing the first clamping block and the second clamping block, wherein the fool-proof mechanism includes a protrusion provided on the top end of the second clamping block moving towards the first clamping block and a notch provided on the first clamping block adapted to the protrusion.

8. A fixture for a key cutting machine, comprising a base, a clamping mechanism and a rotating assembly, wherein
the clamping mechanism comprises a first clamping block, a second clamping block, a central shaft and an adjusting piece, wherein one end of the central shaft is connected to the base and sequentially passes through the first clamping block and the second clamping block, wherein the adjusting piece is disposed at the other end of the central shaft for adjusting the distance between the first clamping block and the second clamping block in order to hold the key, wherein the rotating assembly is disposed between the first clamping block and the base, the first clamping block is rotationally connected to the base, and wherein
the key cutting machine comprises the fixture for a key cutting machine.

* * * * *